Jan. 6, 1925.   1,522,351
C. W. WEISS
UNIVERSAL JOINT
Filed May 4, 1923   2 Sheets-Sheet 1
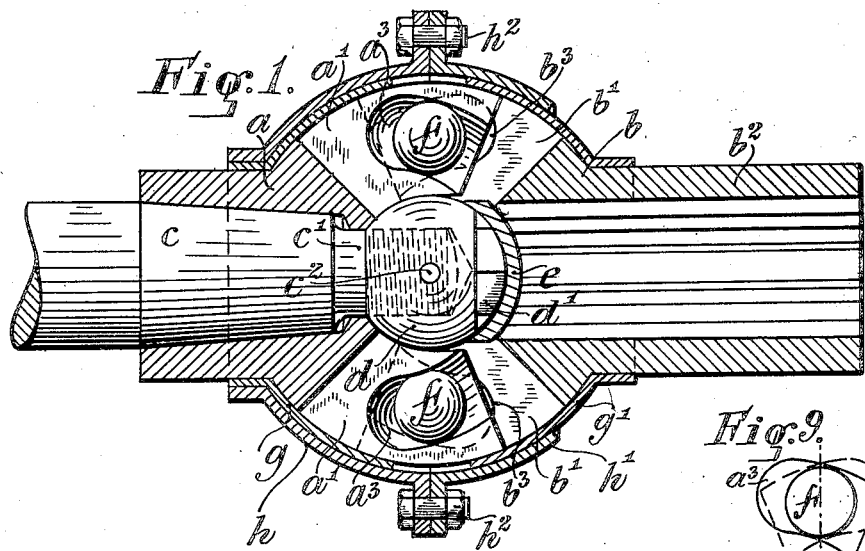
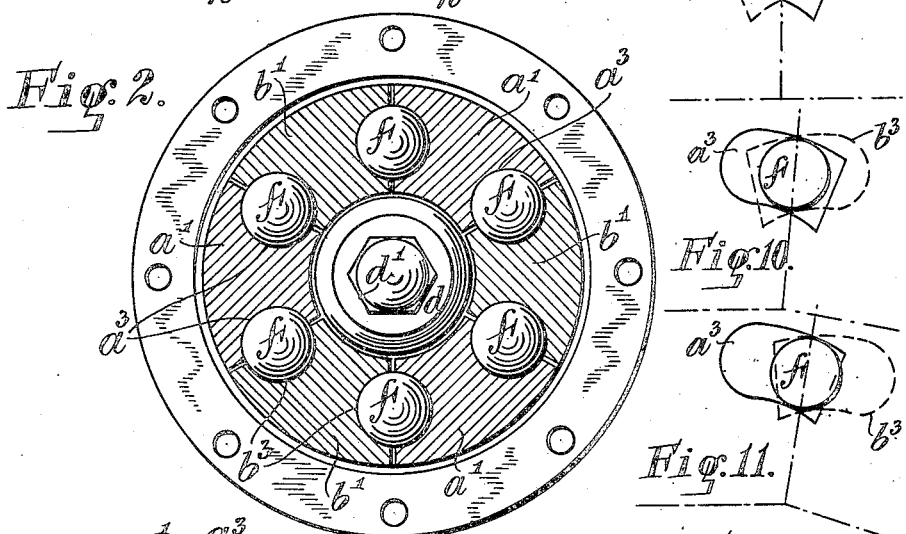
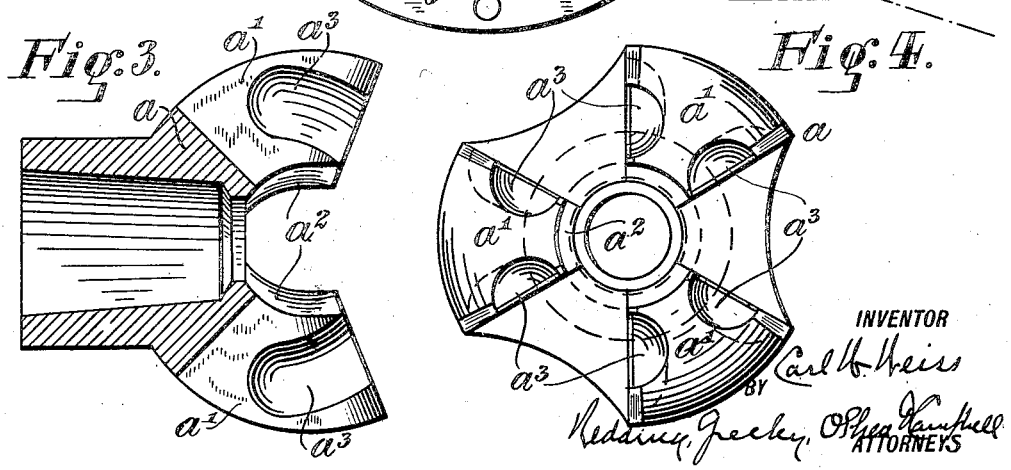
INVENTOR
Carl W. Weiss
BY
ATTORNEYS Jan. 6, 1925.  
C. W. WEISS  
UNIVERSAL JOINT  
Filed May 4, 1923
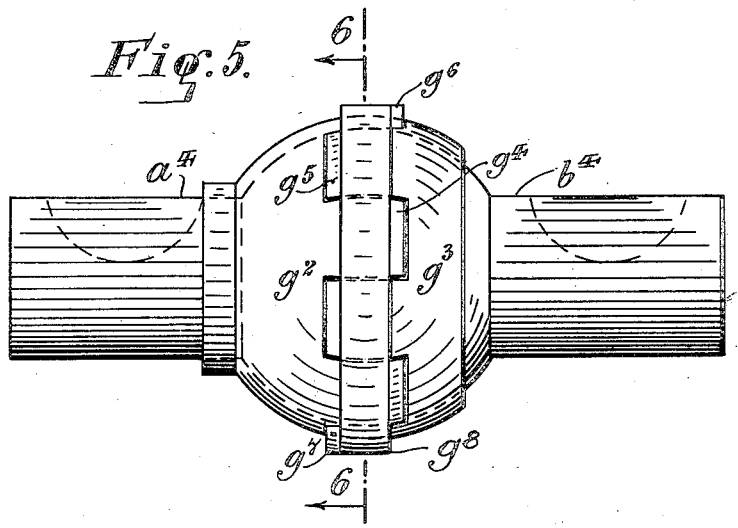
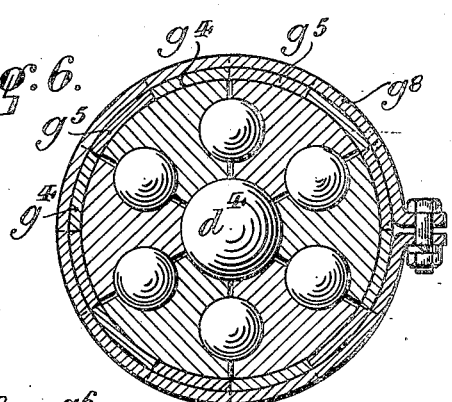
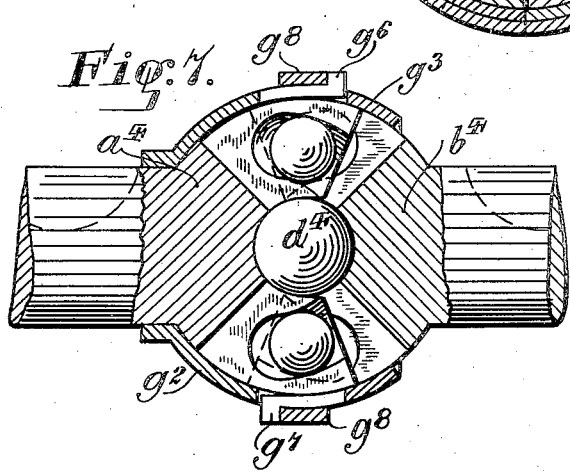
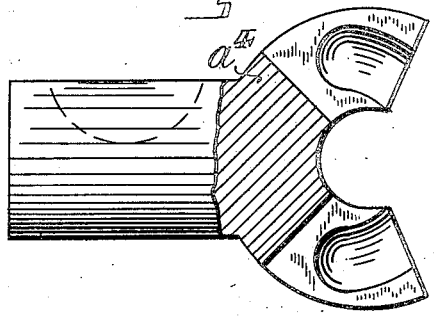

Patented Jan. 6, 1925.

1,522,351

UNITED STATES PATENT OFFICE.

CARL W. WEISS, OF BROOKLYN, NEW YORK, ASSIGNOR OF ONE-HALF TO CLARENCE B. STURGES, OF FAIRFIELD, CONNECTICUT.

UNIVERSAL JOINT.

Application filed May 4, 1923. Serial No. 636,534.

*To all whom it may concern:*

Be it known that I, CARL W. WEISS, a citizen of the United States, residing in the borough of Brooklyn, of the city of New York, in the State of New York, have invented certain new and useful Improvements in Universal Joints, of which the following is a specification, reference being had to the accompanying drawings, forming a part hereof.

Universal joints, through which rotary movement is transmitted from a driving member to a driven member, the axis of rotation of which is at a variable angle with the axis of rotation of the driving member, as heretofore constructed, have had certain undesirable characteristics which have been clearly recognized. In the conventional forked type of universal joints, even when the angle of displacement is moderate, the frictional losses in the transmission of power are considerable. These losses are further aggravated by the difficulty of providing constant and abundant lubrication required by the high unit bearing pressure as the angular displacement of the shafts and the torque increase, the torque being inversely proportional to the torque radius. Moreover, the speed of rotation or angular velocity of the driven part fluctuates between two maxima and two minima in each rotation in a degree expressed respectively by the secant and the cosine of the angle of displacement of the two members. It is the object of this invention to produce a universal joint in which all of these difficulties inherent in the conventional forked type of universal joint, as above explained, shall be overcome, that is to say, a universal joint in which the angular velocity or speed of rotation of the driven member shall be the same as that of the driving member, being constant if the angular velocity of the driving member is constant, and in which the losses of power in transmission shall be reduced to a minimum. In order that the angular velocity of the driven member shall be the same as that of the driving member, it is necessary that the point of contact of the two members, through which motion is transmitted from one to the other, shall be situated in a plane which bisects the angle of displacement of the axes of the two members. This is true of a pair of mitre gears, for example, in which the pitch line of contact must be constant and in which, in order to reduce frictional loss, the contact must be rolling instead of sliding. In a pair of mitre gears, however, these conditions of efficiency in operation can be met only when the angular displacement of the axes of the two members is fixed. It is obviously impracticable to meet these conditions with any form of mitre gears when the angular displacement of the axes of the two members is subject to change while power is being transmitted. In a power transmission device in which the angle of displacement of the axes of the two members is subject to variation, the point of operative engagement of the two members, corresponding to the pitch line contact of two mitre gears on fixed axes, must be capable, during the transmission of power, of such movement that the plane in which it moves, in the rotation of the two members, that is, the plane of its orbit, shall always bisect the angle of displacement of the two members whatever it may be. Furthermore, in order that there shall be no relative fluctuation in angular velocity of the driven member as compared with the driving member, the radial distance of such point of operative engagement must be the same for the driving member and for the driven member at any point in the rotation of the two members on their respective axes. In accordance with the present invention, therefore, provision is made whereby the driven member is driven from the driving member through a point of operative engagement or of transmission of power, whether it be a point of direct contact between the two members or of driving engagement through an interposed element, which is movable both as to the plane of its orbit, so that such plane shall always bisect the angle of displacement of the two members and in such plane so that its radial distance from the axis of the driven member shall be the same, at any instant, as its radial distance from the axis of the driving member. In the case of the mitre gears, referred to above as an illustration, the point of operative engagement of the two gears is fixed in space, but it will be understood that in this general statement of the present invention it is assumed that the point of operative engagement of the two members moves in a closed orbit, which may or may not be truly circular, about the center of angular displacement of the two members, the plane of such orbit always including such center of angular displacement. In the embodiment of the invention which is preferred because of the elimination of frictional losses through rolling contact there is interposed between the corresponding co-acting portions of the two members a ball which constitutes a point of operative engagement between the two members, through which the driving force of the one is exerted upon the other. Means are provided whereby such ball or point of operative engagement of the two members is maintained always in a plane which bisects the angle of displacement of the two members, whatever the angular displacement thereof may be. The invention will be more fully described hereinafter with reference to the accompanying drawings in which it is illustrated and in which—

Figure 1 is a view in longitudinal section through a universal joint which embodies the invention.

Figure 2 is a view in transverse sectional elevation of the joint shown in Figure 1.

Figure 3 is a view in longitudinal sectional elevation of the driving member of the joint shown in Figures 1 and 2.

Figure 4 is a view in end elevation of the driving member shown in Figure 3.

Figure 5 is a view in elevation illustrating a slightly different embodiment of the invention, particularly as to the housing.

Figure 6 is a view in transverse sectional elevation on the plane indicated by the broken line 6—6 of Figure 5.

Figure 7 is a view of the same in longitudinal sectional elevation.

Figure 8 is a view in elevation, partly in section, of one of the members of the joint shown in Figure 7.

Figures 9, 10 and 11 are diagrammatic views illustrating the relation of the ball grooves of two co-acting portions of the two members and the positions assumed by the ball for different angular displacements of the driven member.

As to number and arrangement of co-acting parts of each member, driving and driven, the construction of the improved joint will be governed by place and conditions of use. As shown in the drawings the driving member $a$ is formed with three finger-like portions or projections $a'$ with radial faces and designed to co-act with corresponding finger-like portions or projections $b'$ of the driven member $b$. In the construction shown in Figures 1, 2, 3, and 4, the driving member $a$ is forced upon a tapered shaft $c$ and is held in place thereon by a spherical nut $d$ threaded upon the reduced end $c'$ of the shaft and held by a pin $c^2$, the spherical nut being formed with a flattened portion $d'$ for convenience in assembling. This spherical nut $d$ is received within the finger-like co-acting portions or projections $a'$ of the driving member $a$, in a seat $a^2$ formed therefor, and furnishes a seat upon which may move freely the finger-like co-acting portions or projections $b'$ of the driven member $b$ in its movement of angular displacement. In the embodiment of the invention shown in Figure 1 the shank $b^2$ of the member $b$ is tubular and grooved internally, as in automobile construction, and to take longitudinal thrust and relieve the housing of pressure due to longitudinal thrust a spherical shell $e$ may be interposed between the member $b$ and the spherical nut or bearing $d$, being received in a seat formed therefor in the member $b$.

In the preferred form of the joint shown clearance is provided between adjacent faces of the co-acting portions $a'$ and $b'$, as clearly shown in Figure 2, and there is interposed between adjacent faces of the co-acting portions $a'$ and $b'$ a ball $f$. In the embodiment of the invention illustrated there are six such balls, one between the adjacent faces of each pair of adjacent faces. Each ball, constituting in the construction shown a point of operative engagement between the two members of the joint, has its center always in a plane which includes the center of displacement of the two members and bisects the angle of displacement of the two members. Means must therefore be provided for maintaining the ball with its center in such plane although the position of such plane shifts with every change in the angle of displacement of the two members. The form of such means chosen for illustration herein is preferred for the reason that it is entirely automatic in operation, requires no external devices of any kind and is simple and inexpensive in construction. As shown, each ball is received partly in a groove $a^3$ formed in the face of a portion $a'$ of the member $a$ and partly in a groove $b^3$ in the adjacent face of the co-acting portion $b'$ of the member $b$. The grooves $a^3$ and $b^3$ are not concentric, but are preferably formed on centers which lie in the axes of the two elements $a$ and $b$, but respectively some distance from and on opposite sides of the center of angular displacement of the two members, which is the center of the spherical bearing $d$. The grooves have their longitudinal axes intersecting at an angle. If the grooves of the two co-acting portions were concentric, parallel and of the same radius, the ball might travel to one end or the other of the grooves and so defeat the main purpose of the invention which is to provide between the co-acting portions of the two members of the joint a point of operative engagement or of transmission of pressure which shifts its position as the angular displacement of the two members is varied so that the plane of its orbit bisects the angle of displacement of the two members. By reference to Figures 9, 10 and 11 it will be seen that as the angle of displacement of the axes of the two members of the joint is varied, the point of intersection of the two angularly related grooves is correspondingly displaced so that the angular position of the ball with respect to the axis of the driving member is also correspondingly displaced or, more obviously from Figures 9, 10 and 11, that the center of the ball lies always in a plane which bisects the angle of displacement of the two members, whatever that angle of displacement may be. If the two co-acting grooves of a pair were concentric and at the same radial distance from the axes of the two members, it is obvious that the radial distance of the ball from the axes of the two members would be constant and, of course, equal as between the two members. The co-action of the two non-concentric grooves, which maintains the ball in a plane which bisects the angle of displacement of the two members, occasions a change in the radial distance of the ball from the axes of the two members, but the radial distance of the ball from the axis of one member is always the same as the radial distance of the ball from the axis of the other member and the angular velocity of the driven member is therefore always the same as the angular velocity of the driving member.

For the purpose of retaining the members of the joint in operative relation and at the same time for the purpose of protecting the joint from the entrance of dust, there is provided a housing which, in the embodiment of the invention shown in Figures 1, 2, 3 and 4, comprises two inner, partly spherical shells $g$ and $g'$, fitted upon the corresponding members $a$ and $b$, with such clearance between their proximate edges as will permit the desired angular displacement of the two members, and an external partly spherical shell, fitted upon the shells $g$ and $g'$ and consisting of two parts $h$ and $h'$ which may be united at the equator by lugs and bolts as shown at $h^2$.

The embodiment of the invention illustrated in Figures 5 to 8 is substantially the same as that shown in Figures 1, 2, 3 and 4, but the members $a^4$ and $b^4$ are shown as having solid shanks and the spherical bearing $d^4$ as received in seats formed therefor in the ends of the members $a^4$ and $b^4$. In this embodiment of the invention also the housing is of slightly different construction, comprising a member $g^2$ and a member $g^3$, having interlocking projections $g^4$, $g^5$, some of the projections, as at $g^6$ and $g^7$, being turned up to receive a split locking ring $g^8$ by which the two shells $g^2$ and $g^3$ are held together and thus hold together the members of the joint.

It will be understood that various changes in details of construction and arrangement can be made to suit different conditions of use and that except as pointed out in the claims, the invention is not restricted to the particular construction shown and described herein.

I claim as my invention:

1. A universal joint having two members capable of relative angular displacement and having co-acting portions with their proximate faces formed with non-concentric grooves with their longitudinal axes intersecting at an angle and a relatively movable body received partly in each of such grooves and through which force is transmitted from one co-acting portion to the other.

2. A universal joint having two members capable of relative angular displacement and having co-acting portions with their proximate faces formed with non-concentric grooves with their longitudinal axes intersecting at an angle and a relatively movable ball received partly in each of such grooves and through which force is transmitted from one co-acting portion to the other.

3. A universal joint having two members capable of relative angular displacement and having co-acting portions, a relatively movable element interposed between the co-acting portions and through which force is transmitted from the co-acting portion of one member to the corresponding co-acting portion of the other member, a two-part shell engaging said members and formed with interlocking projections turned outwardly at their ends and a locking ring to engage the outwardly turned portions of the interlocking projections to prevent displacement and retain the two parts of the shell in fixed relation.

This specification signed this 30th day of April, A. D. 1923.

CARL W. WEISS.